United States Patent [19]

Winter

[11] 4,162,552

[45] Jul. 31, 1979

[54] CLEANING DEVICE FOR CIRCULAR DISCS

[75] Inventor: Heinrich J. Winter, Hainburg-Hessen, Fed. Rep. of Germany

[73] Assignee: Heinrich Josef Winter Kunststoffverarbeitung unde Werkzeugbau GmbH, Hainburg am Main, Fed. Rep. of Germany

[21] Appl. No.: 923,174

[22] Filed: Jul. 10, 1978

[30] Foreign Application Priority Data

Jul. 20, 1977 [DE] Fed. Rep. of Germany ....... 2732697

[51] Int. Cl.² .............. A46B 11/00; A47B 81/06; G11B 3/58; G11B 23/50
[52] U.S. Cl. .............. 15/104.92; 15/21 B; 134/149; 211/1.3; 211/40; 274/47; 312/10
[58] Field of Search .............. 15/21 B, 104.92, 160; 134/149; 206/42; 211/1.3, 2, 40, 41; 274/47; 312/10

[56] References Cited

U.S. PATENT DOCUMENTS

| 1,420,004 | 6/1922 | Weide | 211/40 X |
| 2,938,732 | 5/1960 | Mantell | 134/149 X |
| 3,005,223 | 10/1961 | Taylor et al. | 274/47 X |
| 3,077,622 | 2/1963 | Murphy | 15/77 X |
| 3,401,708 | 9/1968 | Henes | 134/149 |

FOREIGN PATENT DOCUMENTS 815004 7/1949 Fed. Rep. of Germany ............. 211/40

Primary Examiner—Daniel Blum
Attorney, Agent, or Firm—Carella, Bain, Gilfillan & Rhodes

[57] ABSTRACT

A cleaning device for a circular disc with a central bore, the device having a shaft on a supporting box to rotatably hold a disc to be cleaned in a cleaning tank, and a drying rack which fits into the box and on which the disc can be dried; there is further disclosed a hub to surround said shaft and enclose a section of the surface of the disc during the cleaning operation.

15 Claims, 8 Drawing Figures

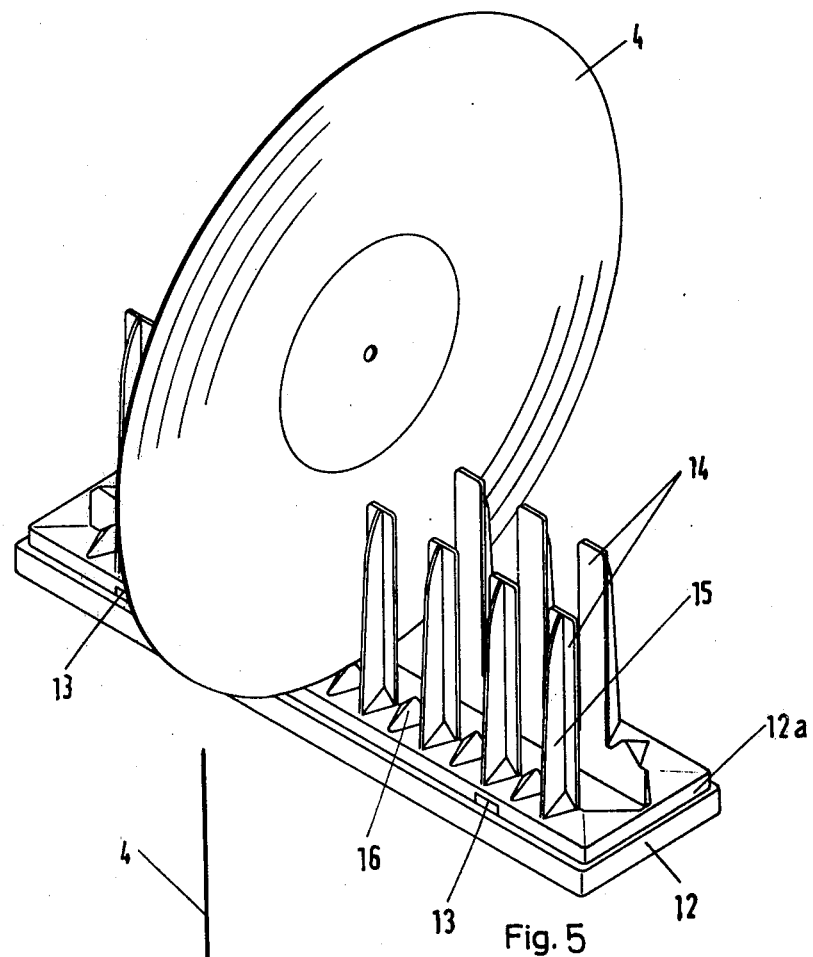
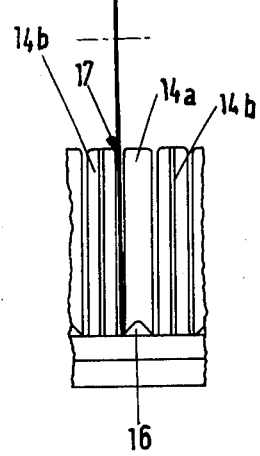
Fig. 5
Fig. 6

CLEANING DEVICE FOR CIRCULAR DISCS

The invention relates to a cleaning device for circular discs having a central bore.

Cleaning devices are used, for example, to clean gramophone records by dipping them into a liquid and subsequently to dry them. One device is known from U.S. Pat. No. 2,938,732, in which the two parts of a hub are centered from either side of a gramophone record, and screwed together, via its central bore. Sealing rings are provided in a suitable manner on the peripheral edge of the two hub sections, which rest respectively on the two sides of the gramophone record, in order to protect the gramophone record label, which lies radially further inwards, from moisture during the washing operation. In the case of this known device, this gramophone record provided with a hub with an axially projecting shaft ends can be dipped into a slot-like liquid tank, the cross-section of which in the plane of the slot is approximately in the shape of a segment of a circle, the angle of the circle segment being less than 180°. Rounded grooves are provided in the two slot walls at the geometric centre of the circle segment, into which the abovementioned shaft ends of the hub are inserted in a manner such that the gramophone record thus supported can rotate freely in the slot-like liquid tank. All the necessary parts of the gramophone record come into contact with the liquid through the rotational movement, so that the desired cleaning is effected. The known liquid tank has, at the lower part of its peripheral surface, a tangentially adjoining base plate so that it can be stood on a flat surface.

In order now to dry the gramophone record after cleaning in the liquid bath, in the case of the known device the surface of the gramophone record is first roughly dried off, after removal from the liquid tank, by wiping with the aid of a sponge, and the gramophone record is then placed on a drying rack, on which the gramophone record is inclined to the horizontal by about 45°.

However, the use of this known drying rack necessitates considerable space, since because of the inclined position of the gramophone record during the drying operation, a correspondingly large projected area of the gramophone record is taken up in the horizontal plane. This manifests itself in a disadvantageous manner, particularly if a large number of gramophone records are to be dried simultaneously. In addition, the upper side and the underside dry off at different rates in the inclined position of the gramophone record, so that long drying times can result, although one side of the gramophone record has already dried off. Furthermore, the storage of the drying racks in the case of the known device is found to be disadvantageous, since these must be accommodated as individual parts, for example in an additional box, and cannot be connected to the liquid tank in any suitable manner for storage.

According to the present invention, there is provided a cleaning device for circular discs having a central bore which comprises a cleaning tank, with a cross-section in the shape of a segment of a circle, standing on a base and having two opposed side walls between which the disc can be rotated freely during the cleaning operation around a shaft extending through the central bore and supported on the side walls, and a drying rack comprising a base and at least one supporting element on which the disc is deposited after cleaning, wherein the cleaning tank has a base which is constructed in the form of a supporting box in which the drying rack can be accommodated for storage. Since the supporting box must be constructed according to the size of the cleaning tank, the drying rack can be constructed in a corresponding size without taking up additional space during storage, since this drying rack is then inside the open hollow space of the supporting box. During use in the intended manner, several discs to be cleaned, for example gramophone records, can be dried because of these relatively large dimensions of the drying rack, the stability of the drying rack being considerably increased through having a construction of large area.

At least one radially extending cleaning element made of elastic material and pressing against the disc surface to be cleaned is advantageously provided on at least one side wall of the cleaning tank, so that the cleaning action in the liquid bath is increased. It is advantageous to provide a cleaning element on each of the two side walls in order to clean both disc surfaces equally well. An elongate brush element is advantageously provided as the cleaning element. In order to make easy replacement of the cleaning element possible, this is advantageously insertable, in a positive manner, into a slot provided on at least one side wall of the tank. The slot tapers, towards the open side at least partially in a wedge-shaped manner in order to prevent the cleaning element from falling out.

The cleaning element advantageously extends from the peripheral surface of the cleaning tank and is shorter than the radius of the tank, so that the cleaning element reaches at most as far as the vicinity of the hub, where cleaning is no longer desired.

The cleaning element is appropriately arranged vertically, that is to say it extends vertically upwards from the lowest point of the cleaning tank having the shape of a segment of a circle. Because of this symmetrical arrangement of the cleaning element within the cleaning tank, the cleaning action is consistent for the two possible directions of rotation of the disc in the liquid bath.

In order to make possible rotatable mounting of the disc with the aid of the fitted hub sections and the shaft ends in a manner such that the disc surface to be cleaned dips into the liquid bath, a circular groove, as a support for the hub, which is open towards the top is advantageously formed in the supporting box at the centre of the circle segment of the cleaning tank.

The upper side of the supporting box preferably slopes towards both sides in the longitudinal direction of the slot, starting from the centre of the circle segment of the cleaning tank.

The base of the drying rack is advantageously constructed as an essentially rectangular base plate, the external horizontal dimensions of which correspond to the internal measurements of the underside of the supporting box. It is thereby possible to insert the drying rack into the hollow space of the supporting box from below, it being possible to achieve positive locking or even non-positive locking by matching the dimensions, so that the two parts can be stored with one another in a simple manner. If the non-positive locking mentioned is inadequate, suitable holding elements acting between the two structural members can be provided. A number of vertically extending supporting elements are provided alternately on the base plate in two longitudinal groups, their position and their separation relative to one another being such that when the drying rack is inserted into the underside of the supporting box, one longitudinal group is in the hollow space on one side of the cleaning tank and the other longitudinal group is on the other side of the cleaning tank. This is advantageous, for example, if the sizes of the supporting elements are chosen so that they would collide with the cleaning tank if they were not displaced in the manner described above. The two longitudinal groups of supporting elements are advantageously aligned parallel to one another.

It is advantageous if the separation of adjacent supporting elements in a longitudinal group is greater than the width of a supporting element plus twice the thickness of the disc to be dried.

On the base plate, between adjacent supporting elements in a longitudinal group, there are appropriately provided tetrahedron-shaped prominences, of which in each case one corner is close to a foot of each of the two adjacent supporting elements and the other two corners are arranged at the separation of an inserted disc to be dried. This means that the two surfaces of the disc to be dried only come into contact with one supporting element, whilst slipping of the disc at the foot of a supporting element over the space to the next supporting element is prevented by the tetrahedron-shaped prominence. This prominence touches only the circumference of the disc to be dried.

In order to keep the contact area of the supporting element on the disc surface to be dried as small as possible, the supporting elements are advantageously constructed in the form of plates, the disc surface to be dried resting on the narrow side of the supporting element. In order to increase the stability of these plate-like supporting elements, they can be supported, in embodiments of the invention, by vertical flat bars arranged perpendicularly to the supporting elements.

Hub sections which possess gripping troughs, by means of which the screwing together of the two hub sections is facilitated, are advantageously arranged on the shaft. In addition, the propulsion of the disc dipping into the liquid bath is facilitated, since touching the disc in its moist peripheral area is undesired because of renewed soiling of the disc and of the liquid.

The supporting box with the cleaning tank and the slots for the brushes is preferably moulded in one piece from plastic material. The drying rack and/or the hub are advantageously moulded from plastic material. The device can thereby be produced in a simple manner, for example by casting, moulding or deep-drawing.

As is known, there are gramophone records with central bores of different diameter. In order thus to provide the possibility of treating both types of gramophone records in the cleaning device, it is proposed that the hub is formed from two hollow shells, to one of which the shaft is connected and that at least one of the hollow shells possesses, coaxially to the shaft, an extended piece onto which an adaptor can be mounted in two opposite positions, in the first position a centering cylindrical section of the adaptor, running coaxially to the shaft, engaging, in a manner such that it centres the disc, into the central bore of the disc held between the free edges of the hollow shells of the hub, whilst in the second position the cylindrical section overlaps the extended piece and the adaptor does not reach as far as the plane given by the free edge of the hollow shell supporting it. A particularly simple design of the adaptor results if the extended piece is of an essentially cylindrical construction and the adaptor comprises two cylindrical sections of different diameter, and furthermore if the axial extent of the adaptor is less than the internal height of a hollow shell, and finally if a projection is provided coaxially to the shaft, beyond the extended piece and adjacent to the side wall of the hollow shell, the radial extent of which is less than the internal diameter of the centering cylindrical section and the height of which above the side wall is greater than the difference between the internal height of the hollow shell and the axial extent of the adaptor, but is less than the internal axial clear height of the centering cylindrical section. In the case of this construction, it is necessary only to correspondingly re-insert the adaptor in one of the hollow shells if, instead of gramophone records having a standard central bore, those with a large central bore are to be used.

An embodiment of the invention is described in more detail below, by way of example with reference to the accompanying drawings, in which:

FIG. 5 shows an oblique view of a drying rack according to the invention, with an inserted gramophone record;

FIG. 6 shows a partial side view of the drying rack according to FIG. 5;

Figure 1:
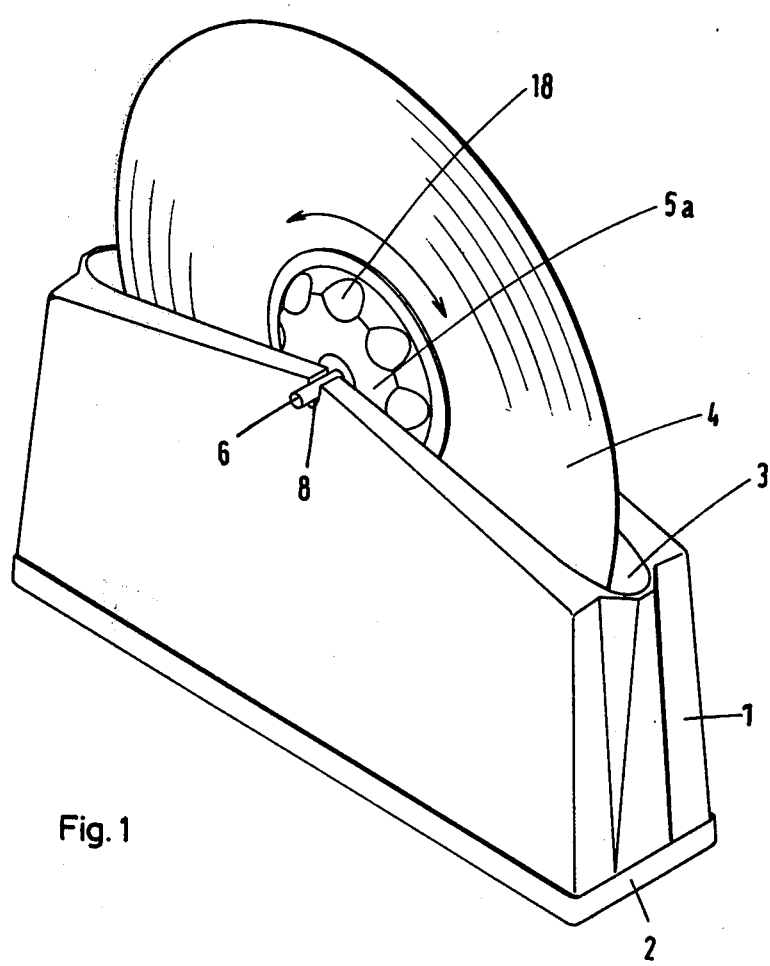
FIG. 1 shows an oblique view of a supporting box according to the invention, with a gramophone record which can be rotated freely in the cleaning tank and with the inserted drying rack.
Figure 2:
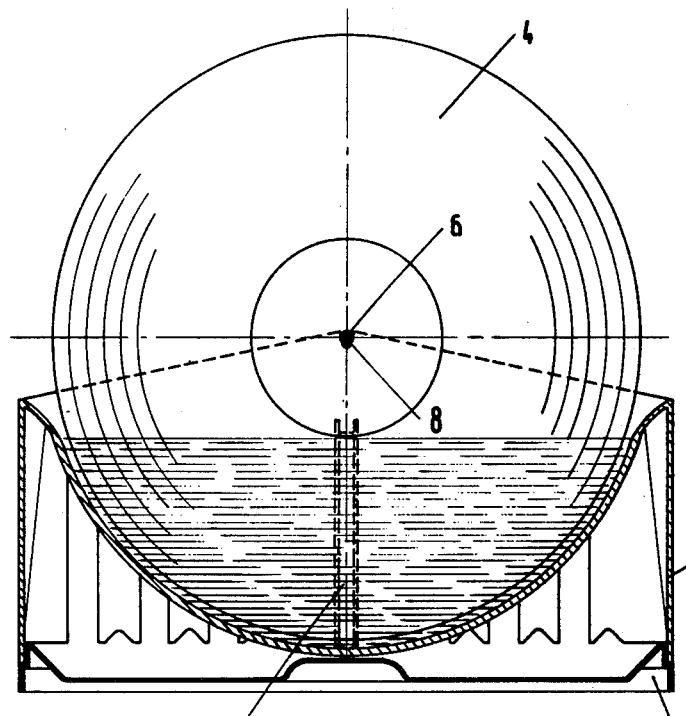
FIG. 2 shows a longitudinal section of the device according to FIG. 1.
Figure 3:
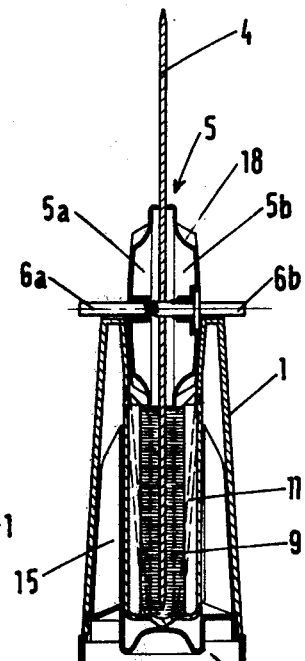
FIG. 3 shows a cross-section of the device according to FIG. 1.
Figure 4:
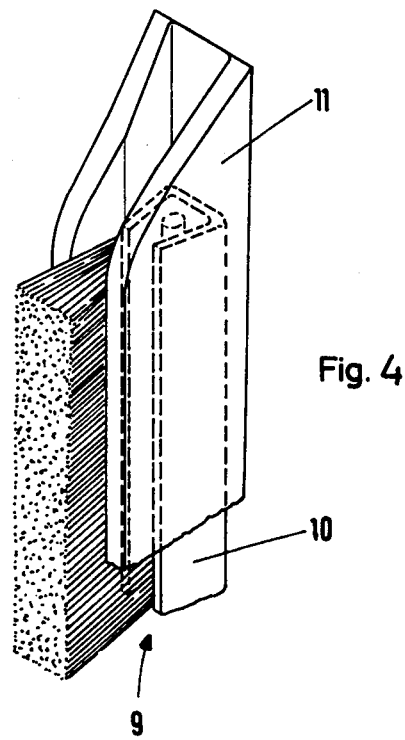
FIG. 4 shows a detailed view of a brush element, with an associated wedge-shaped holding slot.

According to FIGS. 1 to 3, the device according to the invention comprises a supporting box 1, mounted on a drying rack 2, into the upper side of which a cleaning tank 3 which essentially has the shape of a segment of a circle is moulded. A gramophone record 4 dips into the cleaning liquid contained in the cleaning tank 3 and is supported in a freely rotatable manner by means of a hub 5 with a shaft 6 in U-shaped grooves 8 in the upper side of the supporting box 1.

In this position, the shaft 6 coincides with the centre of the cleaning tank 3 having the shape of a segment of a circle. The upper side of the supporting box 1 slopes towards both sides in the longitudinal direction, starting from the groove 8. The hub 5, provided for holding the gramophone record, consists of two hub sections 5a, 5b which are screwed together through the central bore of the gramophone record, the shaft 6a of the hub section 5a having an internal thread into which the shaft 6b, provided with an external thread, of the hub section 5b can be screwed, through the central bore of the gramophone record. The two hub sections 5a, 5b are thereby connected with one another, the gramophone record 4 being firmly clamped between the two hub sections. These hub sections at the same time form a protection for the label of the gramophone record 4 against undesired moisture. For this purpose, the two hub sections can each possess sealing rings in the vicinity of their circumference in a manner which is in itself known, with the aid of which sealing between the particular hub section and the corresponding surface of the gramophone record is effected.

A mechanical elastic cleaning element 9, which can consist, for example, of an elongate brush, is provided inside the cleaning tank 3. The brush has a dovetailed base 10, with the aid of which the cleaning element is held in a correspondingly shaped slot 11 provided on the inside of the cleaning tank 3. Preferably, cleaning elements of this type are provided on both side walls of the cleaning tank and the rotating gramophone record slides between them, so that the removal of dirt on the gramophone record surfaces after loosening by the cleaning liquid is also partly effected mechanically. Both the cleaning liquid and the vertically arranged cleaning element 9 extend approximately to the edge of the hub 5, in order to clean the entire free surface of the gramophone record.

FIGS. 5 and 6 show details of the drying rack, which comprises an essentially rectangular base plate 12 with a plinth 12a, the external measurements of which correspond to the internal measurements of the open underside of the supporting box 1. It is thereby possible to insert the drying rack into the underside of the supporting box 1, for example according to FIGS. 1 to 3. In addition, suitable holding elements 13 can be provided on the base plate 12, which, in the closed position, produce a firm connection between the drying rack 2 and the supporting box 1. These holding elements 13 can be dispensed with, for example, if the dimensions of the plinth 12a relative to the underside of the supporting box 1 permit non-positive locking between these two constructional members.

Two longitudinal groups, parallel to one another, of several supporting elements 14 are provided on the base plate 12, the parallel separation of the two longitudinal groups being only slightly larger than the external measurement of the cleaning tank 3 (compare FIG. 3).

The supporting elements 14 consist essentially of rectangular plates which in each case are arranged in a group in a common plane which runs approximately perpendicular to the base plate 12. Each individual supporting element 14 is additionally supported by a vertical flat bar 15 in order to increase its stability. A space is in each case provided between the individual supporting elements 14 of a longitudinal group, the supporting elements 14 of the other longitudinal group being displaced relative to those of the first longitudinal group so that the supporting elements of the second longitudinal group are just opposite the intermediate spaces of the first longitudinal group and vice versa. Tetrahedron-shaped prominences are in each case provided in the intermediate spaces, at least two corners of which pass directly into the base plate 12, having a slight separation from the feet of the particular adjacent supporting elements. This relatively small separation approximately corresponds to the expected thickness of the disc to be cleaned.

As can be seen from FIG. 6 in particular, the separation between adjacent supporting elements 14b of one longitudinal group is greater than the width of the supporting element 14a, opposite this intermediate space, of the other longitudinal group, and in particular by an amount which is more than twice the expected thickness of the disc to be cleaned. The result of this is that the disc 4 can assume a slightly inclined position, so that only a point of it, at a position 17 of the surface to be dried, rests on a supporting element 14. Any slipping of the disc is prevented by the tetrahedron-shaped prominence 16, on the sloping side of which only the peripheral surface of the disc 4 to be dried rests. Satisfactory drying of a number of discs in a very narrow space is thereby made possible.

Figures 7, 8:
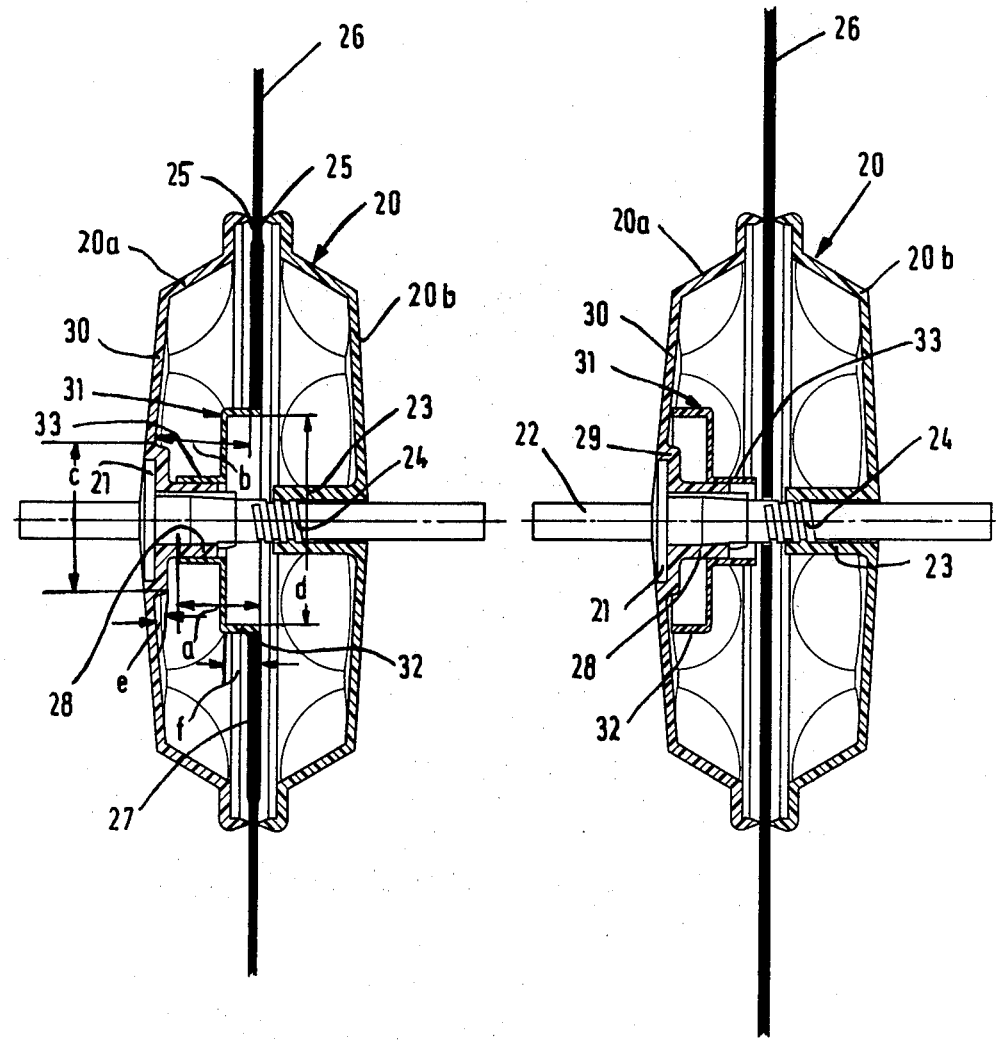
FIG. 7 shows an axial section through the hub in a second embodiment, with an adaptor in the position in which it engages in a bore, of relatively large diameter, in a disc.
FIG. 8 shows an axial section according to FIG. 7, the adaptor being in a position in which it does not engage with the bore in the disc.

FIGS. 7 and 8 show a particular embodiment of the hub 20 of the device. As in the case of the embodiment in the preceding figures, the hub also consists of two hollow shells 20a and 20b. The hollow shell 20a is firmly connected to the shaft 22 via the flange 21. The hollow shell 20b can be screwed onto the thread 24 of the shaft 22 by means of its extended piece 23 on the inside. When the hub 20 is screwed together, the free edges 25 of the two hollow shells 20a, 20b lie against the disc 26, for example the gramophone record, the diameter of the hollow shells 20a, 20b, in the region of the edges 25 being chosen so that the label 27 of the gramophone record 26 is safely protected.

As can be clearly seen from the drawing, the hollow shell 20a of the hub 20 possesses an extended piece 28, which runs concentrically to the shaft 22 and is cylindrical in the embodiment shown. As can be clearly seen from the drawing, the extended piece 28 starts from an essentially annular projection 29 of the side wall 30 of the hollow shell 20a. In the embodiment shown, this projection 29 is produced by appropriately drawing in the side wall 30 to form a depression for receiving the flange 21. The projection 29 can, of course, also be provided in any other manner.

An adaptor, designated in total by 31, can be mounted on the extended piece 28 in a positive manner in two positions opposite to one another, as can be seen by comparing FIGS. 7 and 8. In the embodiment shown, the adaptor 31 comprises two cylindrical sections, namely a centering cylindrical section 32 of relatively large diameter and a fixing cylindrical section 33, the diameter of which is adapted to the diameter of the extended piece 28.

In the first position, which is shown in FIG. 7, a centering cylindrical section 32 of the adaptor 31 extends beyond the plane defined by the edge 25 of the half shell 20a, which means that the centering cylindrical section 32 of the adaptor 31 engages in the relatively large central bore of the gramophone record 26, and the gramophone record 26, which certainly could not be centered by the shaft 22, is thus centered perfectly by the adaptor 31.

In the second position according to FIG. 8, on the other hand, the adaptor 31 is arranged so that it ends before the plane given by the edge 25 of the half shell 20a, that is to say the gramophone record 26 is only centered by the shaft 22, which passes through the central bore of the gramophone record, whilst the adaptor 31 does not come into contact with the gramophone record.

In order to ensure that the positions according to the FIGS. 7 and 8 are achieved without problems, the following dimension rules should be taken into consideration:

The axial extent a of the adaptor 31 must be less than the internal clear height b of the corresponding hollow shell 20a.

The radial extent c of the projection 29 must be less than the internal diameter d of the centering cylindrical section 32.

The height e of the projection 29 above the side wall 30 must be greater than the difference b-a between the internal height b of the hollow shell 20a and the axial extent a of the adaptor.

The height e of the projection 29 above the side wall 30 must be less than the internal axial clear height f of the centering cylindrical section 32.

If the above prerequisites are fulfilled, the particular position required according to FIGS. 7 and 8 is achieved by re-inserting the adaptor.

I claim:

1. A cleaning device for circular discs having a central bore, said device comprising:
   a cleaning tank, a cross-section of the tank being in the shape of a segment of a circle;
   a base on which the tank stands;
   a supporting box formed by the base providing a downwardly opening space;
   two opposed side walls of the tank;
   a shaft supported on the side walls to hold a disc for rotation between the side walls and
   a drying rack having a base, and supporting means on which a disc may be deposited after cleaning;
   wherein the drying rack is of such a size that it can be accommodated in the space of the supporting box for storage with the supporting means flanking the tank.

2. A device according to claim 1, further comprising at least one radially extending cleaning element provided on at least one of said side walls, said element being made of elastic material and pressing against the disc surface to be cleaned.

3. A device according to claim 2, further comprising an elongated brush element provided as the cleaning element.

4. A device according to claim 2, further comprising means defining a slot provided on at least one side wall of the cleaning tank into which slot the cleaning element is insertable.

5. A device according to claim 4, wherein the slot has an open side and tapers towards its open side at least partially in a wedge-shaped manner.

6. A device according to claim 1, further comprising a circular groove, open at the top, the groove being provided in the supporting box and at the centre of the circular segment of the cleaning tank to support the shaft.

7. A device according to claim 1, further comprising an upper surface of the supporting box which slopes towards both sides in the longitudinal direction, starting from the centre of the circle segment of the cleaning tank.

8. A device according to claim 1, wherein the drying rack further comprises:
   a base plate being at least approximately rectangular and having external horizontal dimensions corresponding to internal measurements of the underside of the supporting box;
   said supporting means including a plurality of supporting elements extending vertically from the base plate and being provided alternately in two longitudinal groups; wherein the positions and separations of said elements relative to one another are such that when the drying rack is inserted into the underside of the supporting box, one longitudinal group is in the hollow space on one side of the cleaning tank and the other longitudinal group is on the other side of the cleaning tank.

9. A device according to claim 8, wherein the separation of adjacent supporting elements in a longitudinal group is greater than the width of a supporting element plus twice the thickness of a disc to be dried.

10. A device according to claim 8, further comprising tetrahedrally-shaped prominences, provided on the base plate, between adjacent supporting elements in a longitudinal group, a corner of each prominence being close to each of the two adjacent supporting elements and the other two corners are arranged midway of adjacent supporting elements.

11. A device according to claim 10, further comprising vertical flat bars arranged perpendicularly to and supported by supporting elements, of plate-like construction.

12. A device according to claim 1, further comprising hub sections arranged on the shaft, and gripping edges on the circumferences of the hub sections.

13. A device according to claim 1, further comprising holding elements provided on the base plate of the drying rack for securing it to the supporting box.

14. A device according to claim 1, further comprising a hub having:
   two hollow shells, to one of which the shaft is connected;
   an extended piece on at least one of the hollow shells coaxially with the shaft;
   and an adaptor which can be mounted on said extended piece in two opposite positions such that in the first position a centering cylindrical section thereof can engage and thus centre the disc, whilst in the second position the cylindrical section overlaps the extended piece and the adaptor does not reach as far as that plane defined by the free edge of the hollow shell supporting it.

15. A device according to claim 14, further comprising the extended piece being of approximately cylindrical construction and two cylindrical sections of different diameter forming the adaptor, the axial extent of the adaptor being less than the internal height of a hollow shell; a projection being provided coaxially of the shaft, beyond the extended piece and adjacent to the side wall of the hollow shell, the radial extent of the projection being less than the internal diameter of the centering cylindrical section and the height of the projection above the side wall being greater than the difference between the internal height of the hollow shell and the axial extent of the adaptor, and less than the internal axial clear height of the centering cylindrical section.

* * * * *